(12) United States Patent
Roy et al.

(10) Patent No.: US 7,702,903 B1
(45) Date of Patent: Apr. 20, 2010

(54) LICENSE RE-ALLOCATION SYSTEM AND METHOD

(75) Inventors: Amitava Roy, Lexington, MA (US); Jeffrey R. Young, Upton, MA (US)

(73) Assignee: 3Com Corporation, Marlborough, MA (US)

( * ) Notice: Subject to any disclaimer, the term of this patent is extended or adjusted under 35 U.S.C. 154(b) by 1200 days.

(21) Appl. No.: 11/199,951

(22) Filed: Aug. 8, 2005

(51) Int. Cl.
*H04L 9/00* (2006.01)
*H04L 9/32* (2006.01)
*G06F 11/00* (2006.01)

(52) U.S. Cl. ............... 713/158; 726/27; 726/28; 726/29; 726/30; 380/231; 380/232; 380/233; 380/234

(58) Field of Classification Search ............ 713/158
See application file for complete search history.

(56) References Cited

U.S. PATENT DOCUMENTS 5,758,069 A * 5/1998 Olsen ............... 726/27

2004/0088176 A1 * 5/2004 Rajamani ............... 705/1

* cited by examiner

*Primary Examiner*—Longbit Chai

(57) ABSTRACT

A present invention license reallocation system and method facilitates flexible and effective licensing distribution. The license reallocation system and method enables convenient movement of licensed information between hardware devices while ensuring appropriate compliance with license terms. An expired license indication is generated on license expiration. The expired license indication indicates that prior license keys associated with proprietary information are expired. Upon receipt of a valid expired license indication and expired license keys new license key(s) is issued presumably for a different hardware. A license serial number (LSN) that is both globally unique and mutable is utilized to generate license keys. In one embodiment, the license serial number includes system serial number (SSN) and an extension serial number (ESN). The global uniqueness of the SSN ensures that the tuple (SSN, ESN) is globally unique and the mutable but non-repeating nature of the ESN ensures that the tuple is allowed to change without repeating its value.

20 Claims, 3 Drawing Sheets

LICENSE RE-ALLOCATION SYSTEM AND METHOD

BACKGROUND OF THE INVENTION

1. Field of the Invention

This invention relates to the field of licensing technology. In particular, the present invention relates to a license reallocation system and method.

2. Related Art

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Systems providing these advantageous results are often realized through the use of proprietary digital information. Distributing the proprietary information while maintaining adequate licensing control is often problematic. For example, it is usually difficult to prevent illicit distribution of licensed digital information while allowing limited legitimate transferal or reallocation of the licensed digital information from one piece of hardware to another piece of hardware.

There are numerous underlying technologies that make physical distribution and copying of digital information easy. For example, software programs, music, pictures, movies and the like can typically be distributed in a variety of mediums such as on a disk (e.g., CD, DVD, etc.) or over a network (e.g., Internet, World Wide Web, etc.). However, the ease of physically distributing and copying the digital information also typically makes control of proprietary interests difficult. Proprietary interests in digital information are usually conveyed through limited licenses. However, once the digital information is transferred it is usually difficult to maintain license limitations and unauthorized distribution (e.g., illicit copies) of the digital information. The remoteness of the distribution from direct control of the original proprietary owners (e.g., distribution to numerous dispersed end users) also makes direct control over unauthorized distribution difficult.

There have been numerous traditional attempts at administering digital information licenses. One conventional approach is to attempt to tie a license key to a particular piece of hardware. While this approach may offer some protection for the original proprietary owner of the digital information, the end user is significantly restricted. For example, the end user typically is not allowed to transfer the same key and associated digital information onto another device. These licenses are often issued against a globally unique hardware identification number (e.g., NIC MAC address, system serial number, etc.) that is constant over the life span of the hardware device.

Limiting a license to a particular piece of hardware can be problematic for end users in a number of situations. For example, advances in hardware technology often offer potential for significant performance increases and if an end user purchases a new or upgraded device the digital information is not transferable to the new device under the terms of the license. Many times the content of the digital information does not change (e.g., songs, pictures, movies, legacy software programs, archived data, etc.) but a much better device for presenting the data (e.g., new computer system, music player, etc.) becomes available but can not be utilized with the digital information since the license key is "tied" to legacy equipment. License keys tied to a particular piece of equipment can also present a number of problems in a dynamic enterprise environment with a significant number of devices. In this case the portability of the digital information even within the enterprise is significantly limited.

One traditional approach to license transfer or re-allocation is a manual approach. For example, an end user asks for a new license key for the new hardware and promises not to use the old license key. However, this approach can have a number of limitations. Manual approaches are usually costly and typically do not scale up well, the greater the scale (e.g., larger distribution base) the more manual support required. In addition, as the licensing information increases and more human intervention is involved the greater the likelihood of mistakes occurring. Manual approaches are based upon trust and are often susceptible to abuse (e.g., license violations, illicit copying, use on an unauthorized device(s), etc.). These limitations often result in manual approaches being restricted to exceptional rather than routine circumstances.

Some conventional approaches involve dongle based licensing. A dongle is a piece of hardware attached to the serial port of a hardware unit. License keys are issued against the unique dongle serial number. Attaching the dongle to different hardware (e.g., through the serial port) carries licenses to the new hardware from the original hardware. However, the dongle based licensing approaches also often have a number of limitations. Dongle based licensing is hardware based and involves maintenance and management of a hardware inventory. Dongle based licensing is typically relatively costly and again requires manufactures to provide human intervention. Susceptible to fraud is also a concern in dongle based licensing systems. For example, unauthorized users can typically intercept or "snoop" the data communication between a hardware unit and dongle unit to illicitly retrieve license information.

SUMMARY OF THE INVENTION

A present invention license reallocation system and method facilitates flexible and effective licensing distribution. In one embodiment, a present invention license reallocation system and method enables convenient legitimate movement of licensed information between hardware devices while ensuring appropriate compliance with license terms. In one embodiment of the present invention, a license serial number (LSN) that is both globally unique and mutable is utilized to generate license keys. In one embodiment, the license serial number includes system serial number (SSN) and an extension serial number (ESN). The global uniqueness of the SSN ensures that the tuple (SSN, ESN) is globally unique. The mutable (but non-repeatable) nature of the ESN ensures that the tuple is allowed to change without repeating itself. Expiry changes ESN and therefore, LSN. A new value for LSN makes existing licenses invalid. SSN remains constant making LSN globally unique.

In one embodiment of the present invention, a license re-allocation method facilitates a secure and convenient mechanism for reallocating expired licenses between embedded systems. In addition to changing license serial number (LSN), expiry causes a license expiry indication (LEI) to be generated. Presence of LEI signifies that previously granted license keys have been expired on a system. LEI includes information associated with license serial number (e.g. old and new LSN etc.) and other information regarding expiration of license(s) (e.g., time of license expiration etc.). A license exchange process is performed in accordance with the information contained in the LEI and the actual expired license key(s). In one embodiment, the license exchange process includes checking the validity of the expired license key(s) and accepting it so that new license keys can be granted for different license serial number(s). In one exemplary implementation, checking the validity of the expired license key includes comparing the information (e.g. LSN) embedded within the expired license key(s) to the same information stored within a LEI in addition to making sure that the same expired license key(s) has not been accepted before. The results of the license exchange process include the new license keys(s) for new license serial number(s).

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION OF THE INVENTION

Figure 1:
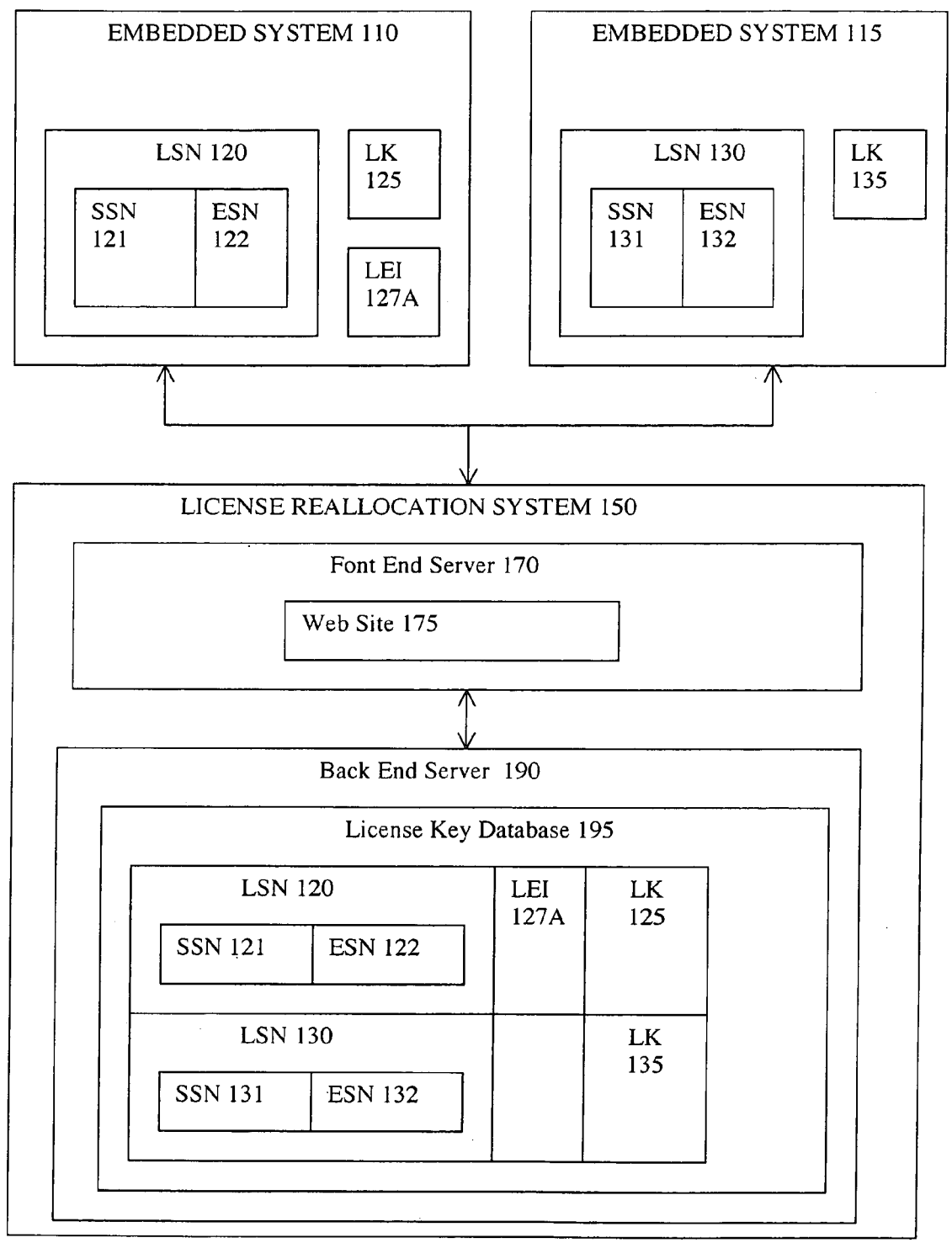
FIG. 1 is a block diagram of an exemplary license re-allocation network in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing", "computing", "translating", "calculating", "determining", "scrolling", "displaying", "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A present invention license reallocation system and method allows convenient movement of licensed information between hardware devices within the terms of a license. A user (e.g., a licensee) expires license on a machine and a license expiry indication (LEI) is generated corresponding to the license expiry event. LEI is generated only when the licenses are expired on a machine and during no other time. Therefore, receiving of the expiry indication by the original issuer proves to the issuer that licenses were indeed expired on the system. Once the licensee turns in the expired license key(s) for exchange, the legitimacy of the expired license key(s) is examined, by comparing information stored in the expired license key(s) and in the corresponding expiry indication. If the expired license key(s) is found to be valid, the issuer is ready to generate new license key(s) in substitute for the expired license key(s).

In one exemplary implementation, the license serial number (LSN) is a superset of a system serial number (SSN) and an extension serial number (ESN). For example, each LSN includes a constant and globally unique SSN and a mutable (but non repeating) ESN. The SSN (e.g., NIC card MAC address, system serial number for NBX call processor unit, etc.) uniquely identifies a piece of hardware globally and remains constant over the life of the hardware. Since ESN can change, LSN changes. Since ESN cannot repeat and since SSN is globally unique, LSN remains globally unique even after change(s). In one embodiment of the present invention, license key(s) are always issued against LSN, which can change yet remain globally unique. In one exemplary implementation, when user expires license(s) on a system, the ESN changes, thereby changing LSN. Change of LSN expires (or invalidates) all existing licenses since existing licenses were issued against old LSN.

In one exemplary implementation, the act of expiry of licenses also causes a license expiry indication (LEI) to be generated. The LEI contains various system related information (e.g. system time during license expiry, system LSN etc.). LEI is generated only and only when an act of license expiration takes place on a machine. Therefore, the presence of LEI signifies that licenses were indeed expired on the system.

Once the LEI is received by the original issuer of license, the original issuer knows that licenses on the system are invalid. By deciphering the information contained in the LEI, the original issuer can uniquely identify the system on which the expiry event occurred. Once the original issuer of license receives an LEI, it is ready to accept/identify expired license keys for the corresponding system.

FIG. 1 is a block diagram of license re-allocation network 100 in accordance with one embodiment of the present invention. License re-allocation network 100 includes embedded system 110, embedded system 115 and license reallocation system 150. Embedded system 110 and embedded system 115 are communicatively coupled to license reallocation system 150. Embedded system 110 and embedded system 115 perform a variety of application operations in accordance with license keys associated with present invention license serial numbers (LSNs) of respective systems. License reallocation system 150 tracks and re-allocates licenses granted to embedded systems 110 and 115 in accordance with the present invention.

In one embodiment license re-allocation system 150 includes front-end server 170 and back end server 190. Front-end server 170 is communicatively coupled to back end server 190. Front-end server 170 hosts a web site with license re-allocation features for receiving license expiry indication (LEI) and expired license keys. Front-end server 170 can also forward new license keys corresponding to old expired license keys.

Back-end server 190 performs a license exchange process associated with the received LEI and expired license key(s). In one embodiment of the present invention, back-end server 190 analyzes a received LEI and stores it for future reference. The received LEI contains the old LSN of an embedded system in addition to other information. At a later time, when it receives an expired license key, it compares the embedded information in the expired key (e.g. LSN etc.) and identifies the corresponding stored LEI. Upon identification, the back-end server 190 stores the expired key and becomes ready to give out new license keys against the payload of the expired license key, making sure the payload in the expired license key is never exceeded in the newly issued key(s).

In one embodiment, back end license server 190 prevents fraud by ensuring license reallocation rules are implemented. One license reallocation rule includes preventing non-expired keys from being exchanged. Back-end server 190 prevents non-expired license keys from being exchanged by verifying that the embedded information in an expired license key (e.g. LSN) matches the same in a stored LEI. If the backend server cannot find any stored LEI for the corresponding supposedly expired license key, it rejects the key. Since LEI is generated only during valid expiration of licenses on a system, its presence confirms that license expiration has happened for the submitted key. Another license reallocation rule requires the system to prevent multiple exchanges of the same expired key for new keys. The back end license server 190 stores the expired license keys that have been submitted and accepted for exchange. Before accepting an expired license key as valid for exchange, the system verifies that the expired license key was not exchanged previously (e.g., by looking for the submitted license key in a license database). In one embodiment, back-end server 190 includes license key database 195 for tracking license information.

Embedded system 110 and 115 store license information. In one exemplary implementation, embedded system 110 stores license serial number 120 and associated license key 125. Embedded system 115 stores license serial number 130 and associated license key 135. It is appreciated that embedded system 110 and 115 can be included in a variety of different types of systems. In one embodiment of the present invention, embedded system 110 is a computer system.

When a user wishes to transfer use of proprietary information from one embedded system (e.g., embedded system 110) to another embedded system (e.g., embedded system 115) the user communicates with license reallocation system 150. In one exemplary implementation, the user expires the license key 125 associated with proprietary information on embedded system 110. The expiry is carried out by changing the value of ESN 122 to a new non-repeating value. This changes LSN 120 from its current value to a new value that is globally unique. Additionally, the expiry generates a license expiry indication (LEI) 127A. Embedded system 110 forwards the LEI 127A to license reallocation system 150 (e.g., via web site 175 hosted by front end server 170). The license reallocation system 150 stores all received information from embedded system 110.

Changing LSN 120 to a new value will expire all licenses on embedded system 110, since it has a new LSN and all existing licenses were issued against the old LSN. However, through a series of exchanges with license re-allocation system 150, embedded system 110 can get back some of its original licenses re-targeted for the new LSN. Therefore, the net result is that embedded system 110 may give up only a sub-set of its original licenses.

The sub-set of license(s) given up by embedded system 110 is now available for redistribution to other systems (e.g. embedded system 115). When embedded system 115 contacts license re-allocation system 150 for new licenses (by giving its LSN 130), new license keys are given out from the pool freed up by embedded system 110 previously.

In one embodiment of the present invention, proprietary information can not be accessed without a valid license key. For example, a software program can not be activated without a proper sequence of binary digits corresponding to a valid license key. In one exemplary implementation of the present invention, license keys and expired license keys are encoded bit streams.

Figure 2:
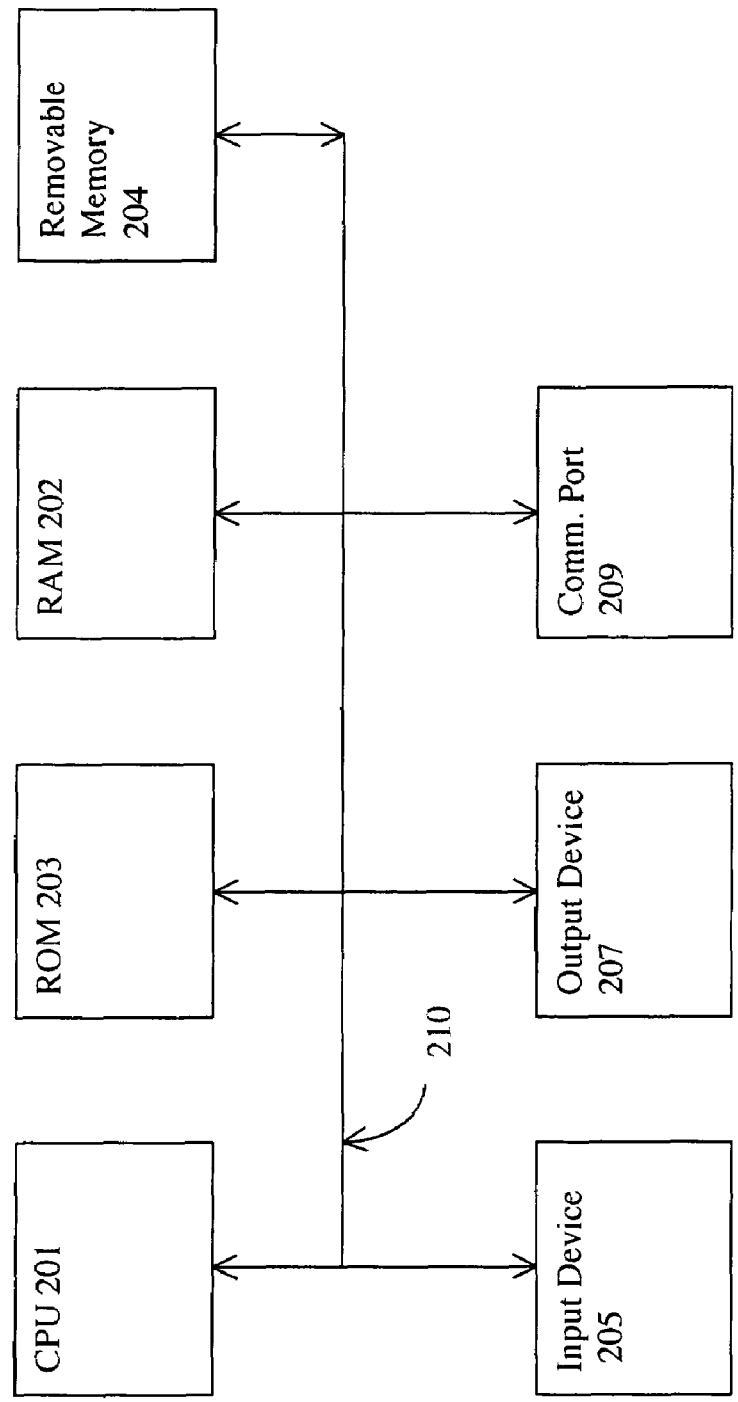
FIG. 2 is a block diagram of a computer system for interacting with a present invention license re-allocation system in accordance with one embodiment of the present invention.

FIG. 2 is a block diagram of computer system 200, in accordance with one embodiment of the present invention. Computer system 200 includes address/data bus 210, central processor 201, volatile memory 202 (e.g., random access memory RAM), non-volatile memory 203 (e.g., read only memory ROM), optional removable data storage device 204 (e.g., memory stick), input device 205 (e.g., keyboard, mouse, etc.), output device 207 (e.g., display, printer, etc.) and network communication port 209. Address/data bus 210 is coupled to central processor 201, volatile memory 202 (e.g., random access memory RAM), non-volatile memory 203 (e.g., read only memory ROM), optional removable data storage device 204 (e.g., memory stick). The components of computer system 200 cooperatively function to provide a variety of functions, including participating in license reallocation related operations. Address/data bus 210 communicates information, central processor 201 processes information and instructions, volatile memory 202 (e.g., random access memory RAM) stores information and instructions for the central processor 201 and non-volatile memory 203 (e.g., read only memory ROM) stores static information and instructions. Optional removable data storage device 204 (e.g., memory stick) also stores information and instructions. Input device 205 enables input, output device 207 enables output, and network communication port 209 coordinates communications with a network.

In one embodiment of the present invention, information stored in the memories of computer system 200 (e.g., memory 202, 203, 204, etc.) and processed by processor 201 includes instructions for participating in a license re-allocation process. For example, a license serial number (LSN) associated with licensed digital information (e.g., a software application, music, movie, etc.) is stored on a memory of computer system 200.

In one exemplary implementation, processor 201 changes the extension serial number (ESN) value and therefore also changes the license serial number (LSN) value of an embedded system. The change of the LSN to a new value invalidates the other existing license keys for the embedded system. The SSN remains constant and therefore does not affect the identity of the embedded system. The invalidation or expiration of the existing license keys generates a license expiry indication (LEI) that signifies that license has been expired on the embedded system. In one exemplary implementation, the LEI conveys additional information, including the old LSN, the new LSN, timestamp of expiration, etc. After expiring a license, computer system 200 contacts (e.g., via a uniform resource locator and the Internet) a license reallocation system (e.g., license reallocation system 150). When a communication link is established with the license reallocation system, computer system 200 forwards the LEI, old license serial number (e.g., LSN 120), new license serial number and existing invalid keys for the embedded system. All expired keys, once validated are added to the pool of licenses available for re-distribution on license validation system 150

In one embodiment of the present invention, an embedded system performs a number of activities associated with license reallocation automatically. In one exemplary implementation of the present invention, the activities are automated by running an executable on the embedded system hardware. For example, an executable can automatically change an LSN of the embedded system, communicatively contact a license reallocation system (e.g., an Internet URL) and communicate both old and new LSNs for the embedded system. The new and old LSNs are stored in a backend database of the license reallocation system. Existing keys of the embedded system can also be communicated to the license reallocation system and stored in the backend database, if necessary. New keys for the new serial number can be automatically transmitted back to the embedded system. This automation in the embedded system reduces the possibility of human error on the part of the end user.

Figure 3:
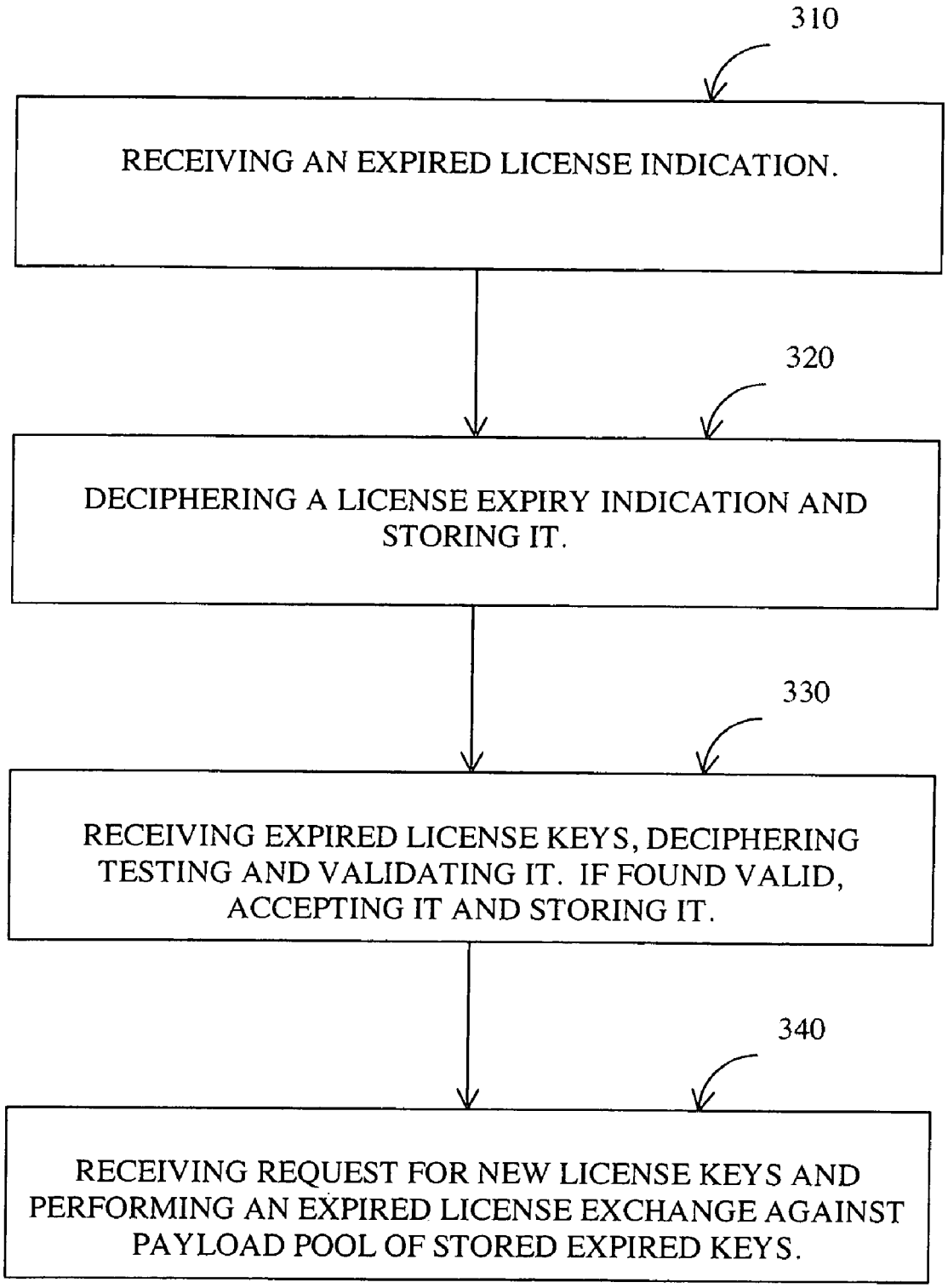
FIG. 3 is a flow chart of a license re-allocation method in accordance with one embodiment of the present invention.

FIG. 3 is a flow chart of license re-allocation method 300 in accordance with one embodiment of the present invention. License re-allocation method 300 facilitates a secure and convenient method for reallocating licenses on embedded systems. In one embodiment, license reallocation method 300 ensures license agreement terms are satisfied and complied with while allowing convenient and legitimate movement of licensed information between hardware devices. It is appreciated license re-allocation method 300 can be implemented on a variety of systems (e.g., license reallocation system 150, a computer system, etc.)

In step 310, a license expiry indication (LEI) is received (e.g., by license reallocation system 150). In one embodiment of the present invention, the LEI includes information associated with the license serial number and expiration of a license. The license serial number is both globally unique and mutable. For example, the license serial number can be a tuple comprising of a unique system serial number and a mutable but non-repeatable extension serial number.

In step 320, the LEI is deciphered and stored. In one exemplary implementation, the deciphering includes, but not limited to, extracting old LSN from the LEI.

In step 330, expired license keys are received and deciphered. They are checked for validity. In one exemplary implementation, the validity check is performed by comparing the LSN embedded within the expired key to the LSN embedded within stored LEI. If a match is found, the expired key is valid and is accepted and stored. The payload capacity of the expired key is added to a license pool for future re-distribution.

In step 340, a license exchange process is performed in response to receipt of new license request, presumably from a different embedded system. A license exchange process issues a new license key when all validity checks (e.g. license payload etc.) are passed. In one exemplary implementation, the new license key can be utilized on a different embedded system (e.g., piece of hardware) than that sent the license expiry indication The payload of the new license key is subtracted from the license pool available for future re-distribution.

Thus, the present invention facilitates convenient and efficient license reallocation. The present invention permits licensed proprietary information distribution and associated access rights to be reallocated to different hardware devices and embedded systems while ensuring appropriate license term compliance. The present invention also reduces the probability of illicit and/or fraudulent use of licensed information by tracking keys that have been retargeted for other hardware units.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A license re-allocation method comprising:
   providing a license re-allocation process at a front-end server;
   receiving a license expiry indication at a back-end server from a machine;
   receiving expired license key at the back-end server from the machine;
   validating expired license key by the back-end server by comparing said expired license key to said license expiry indication;
   performing a license exchange process, in accordance with the license re-allocation process, on said license expiry indication and expired license keys by the back-end server and generating a new license key; and
   forwarding results of said license exchange process to the machine.

2. A license re-allocation method of claim 1 wherein said license expiry indication includes information associated with a license serial number and expiration of a license.

3. A license re-allocation method of claim 2 wherein said license serial number can change and remain globally unique.

4. A license re-allocation method of claim 2 wherein said license serial number is a tuple comprising a system serial number and an extension serial number.

5. A license re-allocation method of claim 1 wherein said license exchange process comprises:
   deciphering said license expiry indication;
   deciphering said expired license keys;
   comparing said expired license key to the said license expiry indication; and accepting and storing the expired license key (for further re-distribution of its payload) if said expired license key matches said stored license expiry indication.

6. A license re-allocation method of claim 5 wherein said deciphering further comprises extracting a load capacity and license serial number from said expired license keys.

7. A license re-allocation method of claim 5 wherein said deciphering further comprises extracting license serial number from said license expiry indication.

8. A license re-allocation method of claim 1 wherein results of said license exchange process includes new license key(s) for a new license serial number.

9. A license re-allocation system comprising:
a front-end server for hosting a web site with license re-allocation features for receiving expired license keys and license expiry indication; and
a back-end server for performing a license exchange process associated with said expired license keys, wherein the back-end server comparing said expired license key to said license expiry indication and generating a new license key.

10. The license re-allocation system of claim 9 wherein said back-end server analyzes said expired license keys; stores information associated with said expired license key and generates a new license key.

11. The license re-allocation system of claim 9 wherein said back-end server prevents non-expired license keys from being exchanged by verifying an embedded license serial number in the expired license key matches license serial number in a stored license expiry indication.

12. The license re-allocation system of claim 9 wherein said back-end server prevents multiple exchanges of said expired license key by verifying said expired license key has not been exchanged before.

13. The license re-allocation system of claim 9 wherein said back-end server includes a database for tracking expired license key information.

14. The license re-allocation system of claim 13 wherein said back-end server tracks expired license keys that have been exchanged, old license serial numbers, new license serial numbers, and expired license keys.

15. A computer system comprising:
a bus for communicating information;
a processor, at a front-end server, for hosting a web site and processing information including instructions for participating in a license re-allocation process;
said license re-allocation process including the receipt of a license expiry indication and expired license keys from a machine in accordance with a license exchange process performed by a back-end server, wherein the back-end server comparing said expired license key to said license expiry indication and generating a new license key;
said processor communicatively coupled to said bus; and
a memory for storing information including information associated with said instructions for participating in said license re-allocation process, said memory communicatively coupled to said bus.

16. The computer system of claim 15 wherein said memory stores a license serial number (LSN) associated with information stored on said memory for execution by said processor, wherein said license serial number is globally unique.

17. The computer system of claim 16 wherein said license serial number can change and remain globally unique.

18. The computer system of claim 17 wherein said license serial number is a superset of a system serial number (SSN) and an extension serial number (ESN).

19. The computer system of claim 18 wherein said system is identified by said unique respective system serial number (SSN).

20. The computer system of claim 18 wherein said system serial number is immutable over a lifetime of associated hardware and said extension serial number is changeable but non-repeatable.

* * * * *